(12) United States Patent
Serrano-Morales et al.

(10) Patent No.: US 7,152,053 B2
(45) Date of Patent: *Dec. 19, 2006

(54) APPROACH FOR RE-USING BUSINESS RULES

(75) Inventors: Carlos A. Serrano-Morales, Sunnyvale, CA (US); David J. Mellor, Burlingame, CA (US); Chris W. Werner, Tabuadelo (PT); Jean-Luc Marce, Sunnyvale, CA (US); Marc Lerman, Fontenay sous Bois (FR)

(73) Assignee: Fair Isaac Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/059,172

(22) Filed: Feb. 15, 2005

(65) Prior Publication Data

US 2005/0149573 A1    Jul. 7, 2005

Related U.S. Application Data

(63) Continuation of application No. 09/852,609, filed on May 9, 2001, now Pat. No. 6,865,566.

(51) Int. Cl.
  *G06F 17/00* (2006.01)
  *G06F 15/18* (2006.01)
  *G06N 5/02* (2006.01)
(52) U.S. Cl. .............................. 706/47; 706/45; 706/46
(58) Field of Classification Search .................. 706/47, 706/45, 46
  See application file for complete search history.

(56) References Cited

U.S. PATENT DOCUMENTS

| 5,119,470 | A |   | 6/1992  | Highland |        |
|-----------|---|---|---------|----------|--------|
| 5,159,662 | A |   | 10/1992 | Grady    |        |
| 5,283,856 | A | * | 2/1994  | Gross et al. | 706/47 |
| 5,481,647 | A |   | 1/1996  | Brody et al. |     |
| 5,555,346 | A | * | 9/1996  | Gross et al. | 706/45 |
| 5,627,764 | A |   | 5/1997  | Schutzman et al. | |

(Continued)

FOREIGN PATENT DOCUMENTS

WO    WO 01/38976 A1    5/2001

OTHER PUBLICATIONS

Advanced acoustic techniques in automatic speech understanding Cook, C.; Schwartz, R.; Acoustics, Speech, and Signal Processing, IEEE International Conference on ICASSP '77. vol. 2, May 1977 pp. 663-666 ☐☐.*

(Continued)

*Primary Examiner*—Anthony Knight
*Assistant Examiner*—Michael B. Holmes
(74) *Attorney, Agent, or Firm*—Michael A. Glenn; Glenn Patent Group

(57) ABSTRACT

An approach is described for developing software that executes rules, such as business rules. A group of rule templates defines a rule structure for rules that may be executed by a rules engine. Separate ruleflow templates define tasks that entail the execution of rules. Each of the ruleflow templates associates a task with the group of rule templates. Because the ruleflow templates define the association between the tasks and the group of rule templates, during execution of the tasks a rules engine executes rules defined by the group of templates. User interfaces are automatically generated based on the group of rule templates. A user may interact with the user interfaces to edit the rules defined by the group of templates. After editing the rules, executing the tasks associated with the group of templates will cause execution of the modified rules.

44 Claims, 11 Drawing Sheets

U.S. PATENT DOCUMENTS

| | | | | |
|---|---|---|---|---|
| 5,701,400 | A * | 12/1997 | Amado | 706/45 |
| 5,774,661 | A | 6/1998 | Chatterjee et al. | |
| 5,802,253 | A * | 9/1998 | Gross et al. | 706/47 |
| 5,835,771 | A | 11/1998 | Veldhuizen | |
| 5,917,489 | A | 6/1999 | Thurlow et al. | |
| 6,057,841 | A | 5/2000 | Thurlow et al. | |
| 6,314,415 | B1 | 11/2001 | Mukherjee | |
| 6,442,537 | B1 * | 8/2002 | Karch | 706/50 |
| 6,615,198 | B1 * | 9/2003 | Aldrich | 706/47 |
| 6,677,963 | B1 | 1/2004 | Mani et al. | |
| 7,020,869 | B1 | 3/2006 | Abrari et al. | |
| 2002/0049961 | A1 | 4/2002 | Fang et al. | |
| 2002/0120917 | A1 | 8/2002 | Abrari | |
| 2003/0110192 | A1 | 6/2003 | Valente et al. | |
| 2003/0217333 | A1 | 11/2003 | Smith et al. | |
| 2004/0034848 | A1 | 2/2004 | Moore | |

OTHER PUBLICATIONS

Extracting structured data from Web pages (Poster) Arvind Arasu; Garcia-Molina, H.; Data Engineering, 2003. Proceedings. 19th International Conference on Mar. 5-8, 2003 p. 698 ☐☐.*

Speech synthesis by rule using an optimal selection of non-uniform synthesis units Sagisaka, Y.; Acoustics, Speech, and Signal Processing, 1998. ICASSP-88., 1988 International Conference on Apr. 11-14, 1988 pp. 679-682 vol. 1.*

An enhanced training method for speech recognition in the VODIS project Chau, E.; Chung, Y.K.; Frangoulis, E.; Lucas, A,;☐☐Acoustics, Speech, and Signal Processing, 1989. ICASSP-89., 1989 International Conference on May 23-26, 1989 pp. 620-622 vol. 1.*

Jones, Steven: GroupWise Remote for the Road Warrior; article; Apr. 1, 1996; http://support.novell.com/techcenter/articles/ana19960404.html.

Reply Memorandum in Support of Plaintiff Fair Isaac Corporation's Motion for Preliminary Injunction; United States District Court District of Minnesota; pp. 1, and 20-25.

Second Affidavit of Carlos Serrano-Morales; United States District Court District of Minnesota; pp. 1, and 5-9.

Declaration of Jacob Feldmand, Ph.D.; United States District Court District of Minnesota; pp. 1, and 5-25.

IBM's Memorandum of Law in Opposition to Plaintiffs's Motion for a Preliminary Injunction; United States District Court District of Minnesota; pp. 1, and 32-52.

BLAZE Software; Blaze Advisor Technical White Paper; updated version 2.5; Mountain View, CA; ww.blazesoft.co; pp. 1-48.

Declaration of Tom Travis; filed Dec. 20, 2005; United States District Court District of Minnesota; pp. 1-29.

Roland R. Wagner, Helmut Thoma; Lecture Notes in Computer Science; Database and Expert System Applications; 7th International Conference DEXA'96; Zurich, Switzerland, Sep. 1996.

Neuron Dta's Advisor 2.5 Lets Business Managers; http://www.prnewswire.co.uk/cgi/news/release?id=40323; News Release Mar. 19, 1999.

Blaze Advisors; Technical White Paper updated v 2.5; 1999 Blaze Software Inc.; pp. 1-48; info@blazesoft.com; www.blazesoft.com.

Neuron Data's Advisor 2.6 Lets Business Managers; Mar. 19, 1999; http://www.prnewswire.it/cgi/news/relaease?id=4033.

F. Casati, M.G. Fugini, I. Mirbel; An Environment for Designing Exceptions in Workflows; pp. 139-158; 1998.

F. Casati; Models, Semantics, and Formal Methods for the Design of Workflows and Their Exceptions; 1996/1998.

F. Casati, S. Castano, M. Fugini, I. Mirbel, and B. Pernici; Using Patterns to Design Rules in Workflows; IEEE Transactions on Software Engineering; vol. 26 No. 8, Aug. 2000; pp. 760-785.

F. Casati, S. Ceri, B. Pernici, G. Pozzi; Conceptual Modeling-ER '96; Title: Workflow Evolution; 15th International Conference on Conceptual Modeling Cottbus, Germany, Oct. 1996.

F. Casati, S. Paraboschi, and G. Pozzi; Specification and Implementation of Exceptions in Worklfow Management Systems; ACM Transactions on Database Systems, vol. 24, No. 3, Sep. 1999 pp. 405-451.

L. Baresi, F. Casati, S. Castano, M.G. Fugini, I. Mirlbel, B. Pernici; WIDE Workflow Development Methodology; Milano, Italy; 1999.

Y. Dong, and A. Goh; An Intelligent Database for Engineering Applications; Division of Software Systems, School of Applied Science, Nanyang Tech. University, Singapore ; 1996.

Streamlined Development—SKYVA Shortens App Deployment; CMP Media Inc. Information Week; 1998.

Leading Global Financial Services Organization Implements SKYVA Solution; Goes 'Live' on SKYVA Solution Within 10 Weeks; Business Wire Inc.; 1999; http://www.businesswire.com.

R. Malone; Turning Traditional Software Upside Down; http://www.inboundlogistics.com/articlessupplychain/sct1298.shtml; Dec. 1998.

F. Casati, M.G. Fugini, and I. Mirbel; An Environment for Designing Exceptions in Workflows; pp. 139-158; 1998.

S. Jones; Novell; Title: GroupWise Remote for the Road Warrior; http://support.novell.com;techcenter/articles/ana19960404.html; Apr. 1, 1996.

I. Rouvellou, K. Rasmus, D. Ehnebuske, L. Degenaro, and B. McKee; Extending Business Objects with Business Rules; 2000 IEEE.

G. Kappel, S. Rausch-Schott, W. Retschitzegger,and M. Sakkinen; Advanced Information Systems Engineering; Title: From Rules to Rule Patterns; Institute of Computer Science, Department of Information Systems, University of Linz, Australia; 8th International Conference, CAISE '96.

G. Kappel, B. Proll, S. Rausch-Schott, and W. Retschitzegger; TriGSflow Active Object-Oriented Workflow Management; Institute of Computer Science, Department of Information Systems, University of Linz, Australia; 1995 IEEE.

G. Kappel, P. Lang, S. Rausch-Schott, and W. Retschitzegger; Data Engineering; Title: Workflow Management Based on Objects, Rules and Roles; Institute of Computer Science, Department of Information Systems, University of Linz, Australia; Mar. 1995.

G. Kappel, and W. Retschitzegger; The TriGS Active Object-Oriented Database System—An Overview; SIGMOND Record, vol. 27, No. 3; Sep. 1998.

Developing a WFT Workflow System; WFT Version 8.0, 2nd Edition; Template Software Inc., Dulles, VA.

Open Market and ILOG Collaborate to Bring Highest Level of 'Dynamic Personalization' to E-Merchandising Customers; LexisNexis Academic; Copyright 2000 PR Newswire Assoc. Inc.; Apr. 3, 2000.

A. Guerra; Wall Street & Technology; Goldman Sachs Embraces Rules-Based Solution; www.wallstreetandtech.com; May 2001.

JP Morgenthal; Use App Servers to Manage Business Rules; http://proquest.umi.com.libproxy.mit.edu/pqdweb?index=0&sid=4&scrchmode=1&vinst=P...; Nov. 30, 1999.

H. Herbst; Business Rules in Systems Analysis: A Meta-Model and Repository System; Information Systems vol. 21, No. 2, pp. 147-166; 1996.

H. Herbst; Advanced Information Systems Engineering; Title: A Meta-Model for Business Rules in System Analysis; Institute of Information Systems, Research Unit 'Information Engineering' University of Berne, Switzerland; Jun. 1995.

H. Herbst; A Repository System for Business Rules; Institute of Information Systems Research Unit 'Information Engineering' Unversity of Berne, Switzerland; 1997.

H. Herbst, G. Knolmayer, T. Myrach, and M. Schlesinger; Methods and Associated Toosl for the Information Systems LIfe Cycle; Title: The Specification of Business Rules: A Comparison of Selected Methodologies.

IBM Prior Art Statement; *Fair Isaac Corporation v. International Business Machine Corporation*; Case No. 05-cv-02081 DWF/SRN.

Tsai, JJ.J. P. et al: "Intelligent Support for Specifications Transformation" IEEE Computer Society, Los Alamitos, US vol. 5, No. 6.

Hsu, L.H. "Configuration Management in HILDA System" Proceedings of the International Conference on Tools for Artificial Intelligence, Nov. 1990, IEEE Computer Society, US vol.

On the relation of order-statistics filters and template matching: optimal morphological pattern recognition Schonfeld, D.; Image Processing, IEEE Transactions on, vol.: 9; Issue 5; May 2000.

Creating a focused application simulator with flexible decision making capabilities MAzziotti, B. W.; Armstrong, F. B.; Simulation Conference Proceedings, 1994. Winter, Dec. 11-14, 1994.

A multiplier-free fixed-task digital CNN array for video segmentation system Paaslo, A.; Paakkulainen, J.; Isoeho, J.; Circuits and Systems, 2000, Proceedings, ISCAS 2000 Geneva, The 2000 IEEE International Symposium on vol. 3, May 2000.

Straightforward design of robust cellular neural networks for image processingb Monnin, D.; Merial, L.; Koneke, A.; Herault, J.; Cellular Neural Networks and Their Applications, 2000. Proceedings of the 6th IEE International Workshop.

Image segmentation and object recognition by Bayesian grouping Kallitzin, S. N.; Staal, J. J.; Romeny, B. M. terH.; Viergever. M. A.; Image Processing. 2000. Proceedings. 2000 International Conference on, vol.; 3, Sep. 10-13, 2000.

Application of fuzzy, GA and hybrid methods to CNN template learningDean, M. —D.; Halgamuge, S.; Giesner, M.; Braunsforth, S.; Cellular Neural Networks and their Applications, CNNA-96, Fourth IEEE International Workshop on, 24-26.

Concept-based speech translation Mayfield, L; Gavalda, M.; Ward, W.; Waibel, A.; Acoustics, Speech, and Signal Processing, 1995. ICASSP-95., 1995 International Conference on, vol.: 1, May 9-12, 1995.

Caisarts: a tool for real-time scheduling assistance Humphrey, M.; Stankovic, J.A.; Real-Time Technology and Applications Symposium, 1996. Proceedings., 1996. IEEE, Jun. 10-12, 1996.

* cited by examiner

Select the product that
will be promoted:

| Cognac ▼ |
| Cognac |
| Wine |
| Brandy |

504

Enter minimum age: [20]

Select employment status:

| Full Time ▼ |
| Self Employed |
| Part Time |
| Full Time |

(Submit)
516

APPROACH FOR RE-USING BUSINESS RULES

RELATED APPLICATIONS

This application is a continuation of application Ser. No. 09/852,609, entitled "Approach for Re-Using Business Rules," filed May 9, 2001, which application is incorporated herein in its entirety by the reference thereto.

FIELD OF THE INVENTION

The invention is generally related to information management systems and more particularly, to a computer implemented approach for generating business rules.

BACKGROUND OF THE INVENTION

Many decisions made by business enterprises can be represented by one or more business rules. As used herein the term "rule" refers to one or more actions or operations that are performed upon the satisfaction of one or more conditions. Thus, a "business rule" refers to one or more business actions or business operations that are performed upon the satisfaction of one or more conditions. For example, in the context of a financial company that issues credit cards, the process for determining whether to offer a credit card to a particular individual based upon particular financial or demographic information can be represented by one or more business rules.

Business rules are important because they allow business decisions to be automated using computer software. The business logic and conditions defined by business rules are embodied in computer software. Referring to the prior example, it is not uncommon for financial companies to automate, using computer software, the decision about whether a credit card should be offered to a particular individual. Conventionally, these types of computer systems use complex customized software to implement business rules.

A significant problem with using custom software to implement business rules is that the people in business organizations who decide on changes to business rules generally cannot themselves implement those changes in the computer software. When business logic or conditions change, the computer software must be updated to reflect the change. For example, in the context of issuing credit cards, if the minimum salary requirement is changed from X to Y, then the software must be manually updated to reflect the change in the minimum salary requirement from X to Y. Updating computer software generally requires technical expertise that the business people who decide the business rules simply don't have. These people are often financial analysts or high-level managers. Updating the software typically involves changing values in source code or data files and then "rebuilding" the software, which requires recompiling source code to generate object code and then linking the object code with libraries of other object code to generate a new runtime executable.

Some companies use a database system to store condition values so that the condition values can be updated and used by application software without having to rebuild the application software. When condition values are updated, the software retrieves the updated values from the database. This solves the problem of having to rebuild application software when condition values change, but still does not allow business people who define business rules and changes to implement those changes themselves. Furthermore, databases are generally not capable of storing the complex business logic required by business rules. Rather, the business logic must still be embodied in the complex custom software. Hence, changing business logic rules requires updating the custom software, which cannot be done by non-technical personnel.

Based upon the need for non-technical people to be able to update business rules and applications that use the business rules, an approach for updating business rules and applications that use them that does not suffer from limitations of prior approaches is highly desirable.

SUMMARY OF THE INVENTION

An approach is described for developing software that executes rules, such as business rules. According to an aspect of the present invention, a group of rule templates defines a rule structure for rules that may be executed by a rules engine. Separate ruleflow templates define tasks that entail the execution of rules. Each of the ruleflow templates associates a task with the group of rule templates. Because the ruleflow templates define the association between the tasks and the group of rule templates, during execution of the tasks a rules engine executes rules defined by the group of templates.

According to another aspect of the present invention, user interfaces are automatically generated based on the group of rule templates. A user may interact with the user interfaces to edit the rules defined by the group of templates. After editing the rules, executing the tasks associated with the group of templates will cause execution of the modified rules.

BRIEF DESCRIPTION OF THE DRAWINGS

The invention is illustrated by way of example, and not by way of limitation, in the figures of the accompanying drawings and in which like reference numerals refer to similar elements and in which:

FIG. 5 is a block diagram depicting the screen of user interfaces for collecting user choices for an editable rule element according to an embodiment of the invention;

DETAILED DESCRIPTION OF THE INVENTION

A method and apparatus for generating and updating rules is described. In the following description, for the purposes of explanation, numerous specific details are set forth in order to provide a thorough understanding of the invention. It will be apparent, however, that the invention may be practiced without these specific details. In other instances, well known structures and devices are shown in block diagram form in order to avoid unnecessarily obscuring the invention. Various aspects of the invention are described hereinafter in the following sections: 1) overview; 2) rule elements; 3) illustrative template; 4) rule element provider types and structure; 5) rule element holders; 6) illustrative user interface; 7) creating rules from templates; 8) conditions as editable rule elements; 9) reuse of templates with ruleflow templates; 10) illustrative re-use of rule templates in a ruleflow; and 11) implementation mechanisms.

1. Overview

Figure 1A:
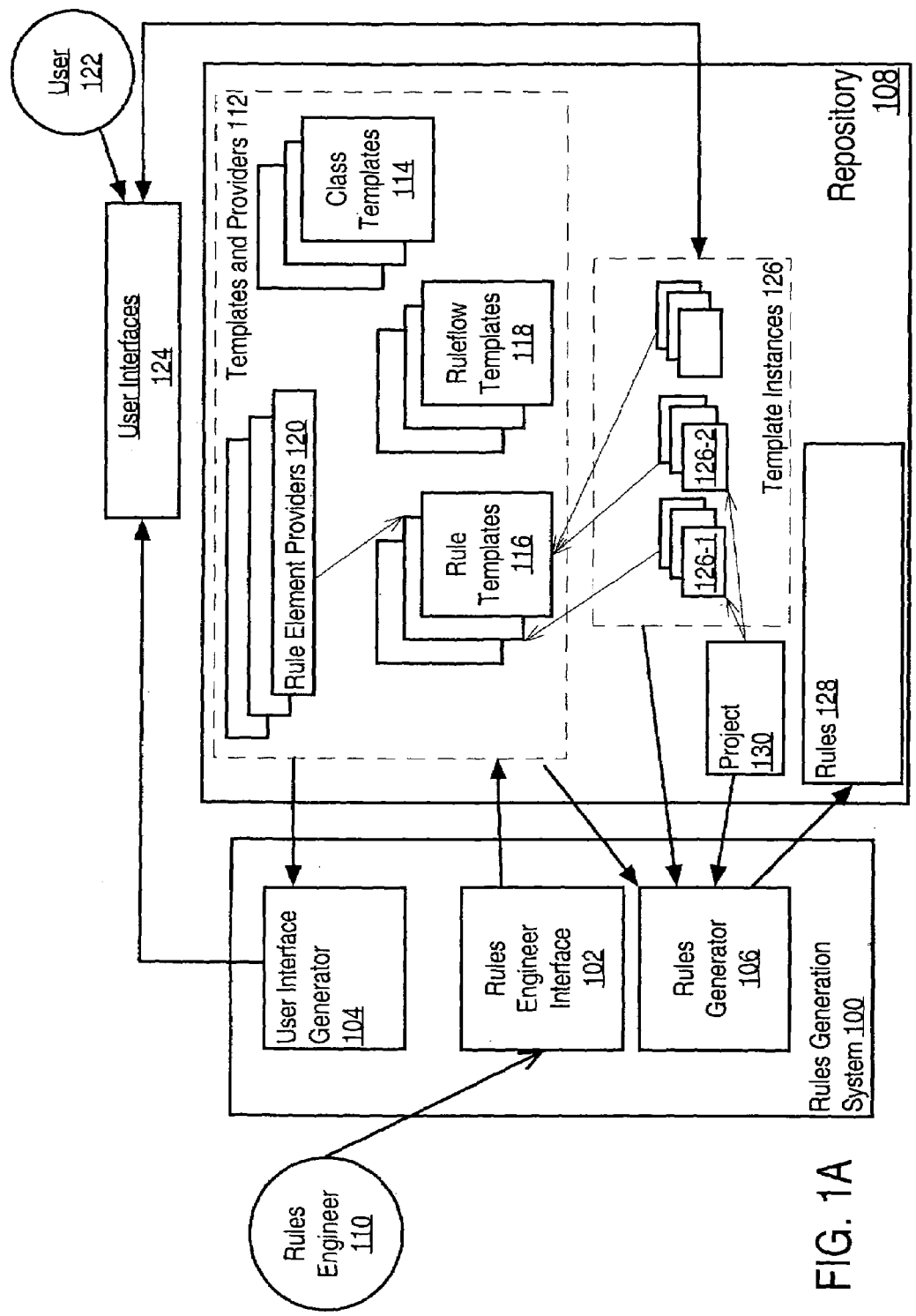
FIG. 1A is a block diagram depicting a system for generating rules that are stored in a rules repository according to an embodiment of the invention.

A novel approach is described for assembling rules applications by re-using rules. The approach is based on a system that uses templates that describe a structure for rules. FIG. 1A is an overview of such a system according to an embodiment of the invention. FIG. 1A is a block diagram depicting an example architecture of a rules generation system 100, which is a system that facilitates generating and updating rules according to an embodiment of the invention. Rules generation system 100 includes various components: a rules engineer interface 102, user interface generator 104, and a rules generator 106. These components generate various entities which are stored in repository 108. Repository 108 may be any storage mechanism, including database systems and repositories that store data according to the XML standard.

Rules engineer interface 102 is an interface through which a rules engineer, such as rules engineer 110, may generate templates and providers 112, which are stored in repository 108. Templates and providers 112 contain class templates 114, rule templates 116, ruleflow templates 118, other types templates not shown (e.g. function templates), and rule element providers 120. In general, a template is data that describes an entity that may be executed by a rules engine. Class templates 114, for example, define classes.

Rule templates 116 define rules. In particular, a rule template specifies a rule structure, rule elements that may be chosen by a user 122, and rule elements that may not be chosen by user 122. Rule elements are the elements that form a rule. Examples of rule elements include, without limitation, operators, variables, constants, conditions, and actions. A template may define a subset of rule elements that comprise a complete structure for a rule.

Ruleflow templates 118 is a set of ruleflow templates. A ruleflow template is data that defines a ruleflow. A ruleflow is a flow of execution of a set of tasks, where the set of tasks includes a task involving the execution of a group of rules. According to an embodiment of the present invention, rules tasks entail the execution of rules associated with a group of templates. Ruleflow templates shall be described in greater detail herein after.

Rule element providers 120 define a set of choices that a user may choose for a particular editable rule element defined by a template. For example, a rule element provider may define a set of strings that a user 122 may choose for a rule element.

User interface generator 104 generates user interfaces 124. User interface generator 104 creates user interfaces 124 to guide a user, such as user 122, to create or edit rules according to definitions specified by rule templates 116 and rule element providers 120. Once generated, user interfaces 124 present editable rule elements that may be edited by the user, and present and limit the choices the user may choose for the rule elements. For example, an editable rule element may be a string value representing the abbreviation of a state. In this context, a user interface may include a list box control that allows a user to choose a value for the editable rule element. Thus, in this example, the list box control displays a list of states that may be selected by the user. In this way, the user interface presents and limits the choices the user may choose for the editable rule element. User interfaces 124 insulate user 122 from many of the complicated details of engineering rules.

User interfaces 124 generate rule element choice data that represents the choices made by a user for editable rule elements. The rule element choice data is stored as one or more "instances of a template" (herein template instances). Template instances 126 represent a set of choices a user makes for the one or more editable rule elements defined by a rule template of rule templates 116.

According to an embodiment of the invention, user interfaces 124 are embodied as one or more Web pages. These web pages may contain embedded code, scripts, or programs that are executed at a client, such as a browser. These programs can be, for example, Java applets, Java scripts, or Active X controls. The programs may be stored temporarily in the cache of a client, or more permanently as, for example, one or more plug-in applications.

Rules generator 106 generates rules and stores the rules as rules 128 in repository 108. Rules generator 106 generates rules 128 according to rule structures specified by rule templates 116 and the choices for editable rule elements specified by template instances 126.

Rules generator 106 may also use other information to generate rules. For example, rules generator 106 may use rule templates 116, template instances 126 and other rule data that specifies one or more attributes of a rule not specified by the template instances 126.

A project, such as project 130, refers to one or more template instances. Project 130 refers to template instances 126-1 and 126-2. A project groups template instances into a module from which rules generator 106 generates a set of rules. Rules generator 106 is capable of generating a group of rules from the template instances referred to by a particular project. According to an embodiment of the invention, a set of template instances, such as template instances 126-1, maybe stored in a data file. Rules generator 106 may generate a group of rules from a particular data file.

2. Rule Elements

Figure 1B:
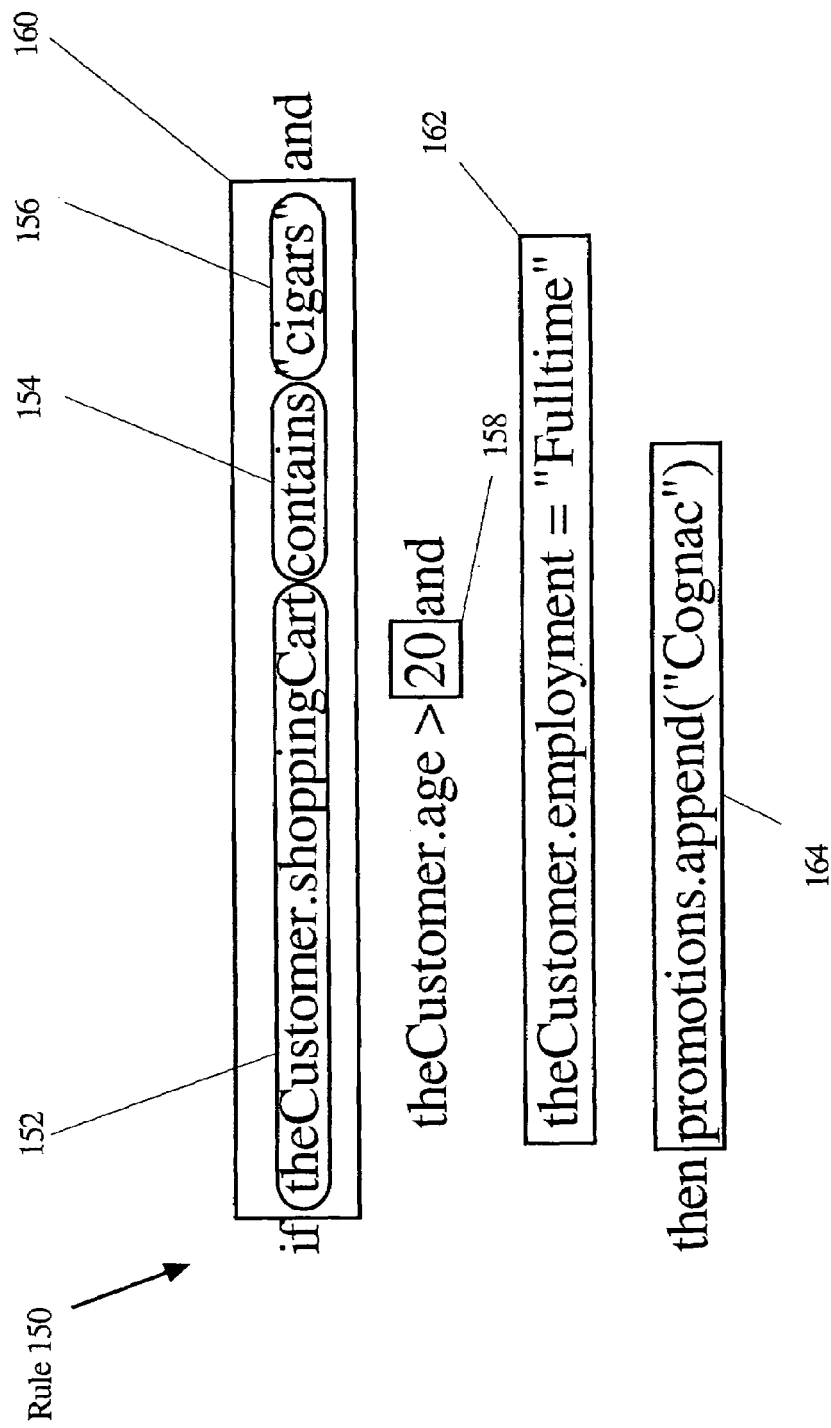
FIG. 1B is a diagram depicting a rule according to an embodiment of the invention.

FIG. 1B is a diagram that depicts rule 150 and its constituent rule elements according to an embodiment of invention. Rule 150 may be written according to a rules language, for example the structured rule language (SRL), defined by Brokat Technologies Incorporated. Rules written in SRL may be transformed, e.g., compiled, into another form, e.g., code that is executable by a rules engine.

Referring to FIG. 1B, rule 150 includes rule elements 152, 154, 156, 158, 160, 162 and 164. Rule element 152 is a variable in the form of an attribute of an object, in particular, the shoppingCart attribute of the object theCustomer. Rule element 154 is an operator, in particular, the contains operator. Rule elements 156 and 158 are constants; rule element 156 is the string constant "cigars", rule element 158 is the constant integer 20. Rule element 160 is a condition in the form of an expression formed by rule elements 152, rule element 154, and rule element 156. Rule element 162 is another example of a condition. Rule element 164 is an action in the form of a method invocation, i.e., an invocation of the method append of object promotions.

Rules, rule elements, and rules engines are discussed in Blaze Advisor.™., Technical White Paper, by Blaze Software.™., Inc., 1999, the contents of which are hereby incorporated by reference.

3. Illustrative Template

Figure 2:
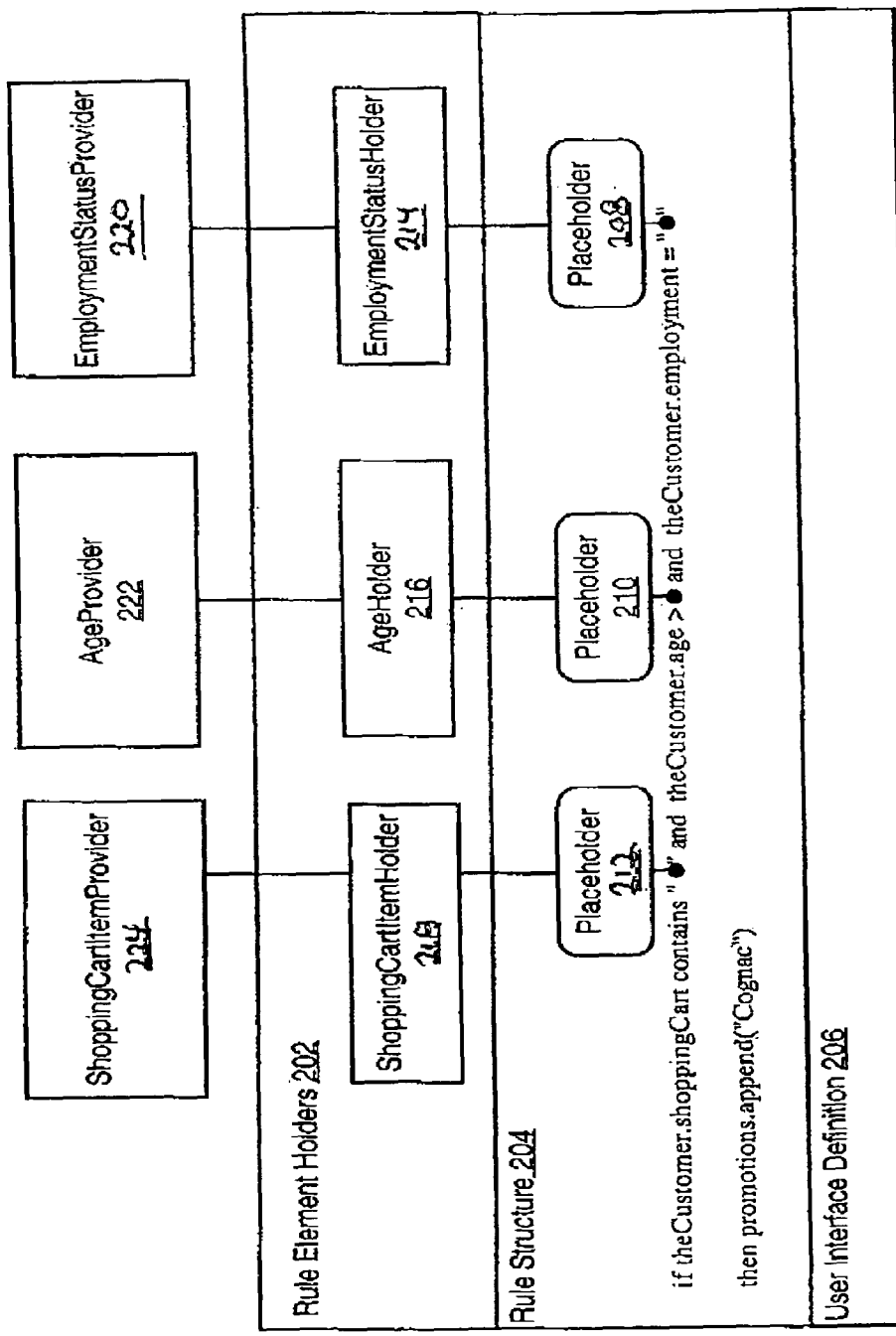
FIG. 2 is a block diagram depicting a rule template according to an embodiment of the invention.

FIG. 2 is a block diagram depicting an illustrative template and rule element providers in greater detail. Referring to FIG. 2, rule template 200 is comprised of three types of data: rule element holders 202, rule structure 204, and user interface definition 206. User interface definition 206 defines aspects of user interfaces 124.

Rule structure 204 generally defines a rule structure that specifies non-editable rule elements and locations in the rule structure that are occupied by editable rule elements. Rule structure 204 may include SRL code that defines non-editable elements. An editable rule element's position within a rule structure is specified by a placeholder such as placeholders 208, 210, and 212. According to one embodiment of the invention, placeholders are embedded in SRL code.

In the present example, placeholders 208, 210, and 212 refer to rule element holders ShoppingCartItemHolder 214, AgeHolder 216, and EmploymentStatusHolder 218, respectively. A rule element holder may define characteristics about an editable rule element. For example, a rule element holder may define whether an editable rule element is a string value, a collection of string values, an operator, or a condition. A rule element holder may also identify a template that defines a portion of a rule structure, as shall be described in greater detail herein after.

Rule element holder ShoppingCartItemHolder 214, AgeHolder 216, and EmploymentStatusHolder 218 each refer to a rule element provider. A rule element provider defines a set of choices a user may choose for an editable rule element. The rule element provider also constrains the choices a user may choose for the rule element. For example, a rule element provider may define a list of string values (abbreviations of states) as a set of choices for an editable rule element representing a state. The rule element provider thus defines the list as the set of choices for the editable rule element, and constrains the user to members of the list. In this present example, ShoppingCartItemHolder 214 refers to ShoppingCartItemProvider 220, AgeHolder 216 refers to AgeProvider 222, EmploymentStatusHolder 218 refers to EmploymentStatusProvider 224. AgeProvider 222 restricts the value of an editable rule element to an integer value between 20 and 100.

4. Rule Element Provider Types and Structure

Figure 3:
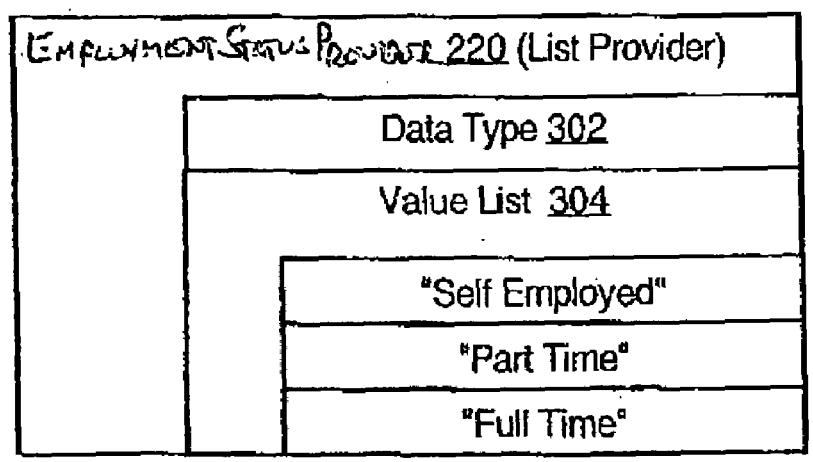
FIG. 3 is a block diagram depicting rule element providers that describe choices for editable rule elements according to an embodiment of the invention.
Figure 3:
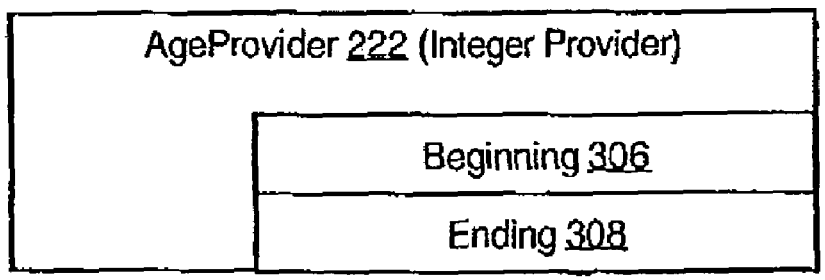
Figure 3:
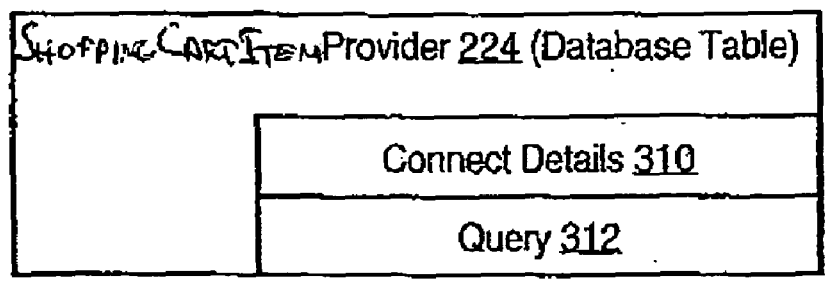

There are various types of rule element providers. The structure of a rule element provider and the information it contains depends on its type. FIG. 3 is a block diagram depicting rule element providers ShoppingCartItemProvider 220, AgeProvider 222, and EmploymentStatusProvider 224 in greater detail to illustrate example types of rule element providers and structures.

ShoppingCartItemProvider 220 is a list rule element provider. A list rule element provider defines a list of data value choices for a rule element. ShoppingCartItemProvider 220 includes a data type 302 that defines the data type of the values in the list, which in this case is string. Value list 304 contains the list of string values. The list of string values, which represent employment status, include 'Self Employed', 'Part Time', and 'Full Time'.

AgeProvider 222 is an integer rule element provider. An integer rule element provider defines a range of value choices for an editable rule element. Beginning 306 defines the beginning of the range and ending 308 defines the end of the range. AgeProvider 222 (FIG. 2) is used to constrain the value of an editable rule element corresponding to a human age. Accordingly, beginning 306 is set to 0 and ending 308 to xxx.

EmploymentStatusProvider 224 is a database provider. A database provider defines a set of data value choices for a particular rule element, where the set is the result set of a database query. Connect details 310 contain information about how to connect to a database. This information includes, for example, the location of the database server, and a user name and password. Query 312 is data defining a query. Such data may be a query string written in SQL. For example, EmploymentStatusProvider 224 defines a collection of data strings describing products, where the collection is the result set of a query issued against a database table containing product names.

Other types of rule element providers may define a set of data value choices from sources other than database systems. For example, a rule element provider may use the values in a data file or other repository to define the particular data value choices for a editable rule element.

5. Rule Element Holders

Figure 4:
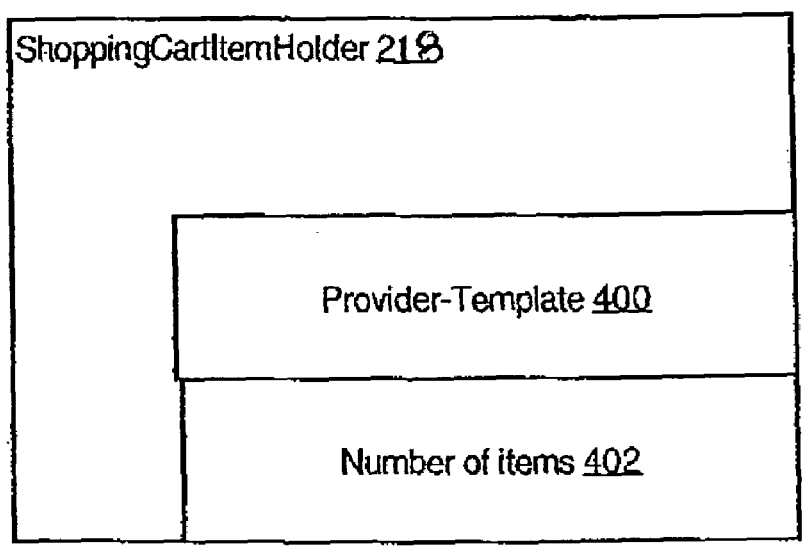
FIG. 4 is a block diagram depicting rule element holders used to describe editable rule elements according to an embodiment of the invention.

FIG. 4 is a block diagram depicting an example implementation of ShoppingCartItemHolder 214. In this example, ShoppingCartItemHolder 214 includes data elements provider-template 400, and number of items 402. Provider-template 400 will identify either a rule element provider or a template, depending on the rule element holder's type. According to an embodiment of the present invention, a rule element holder may have one of several types: a provider type or a template.

ShoppingCartItemHolder 214 is an example of a provider type of rule element holder. A provider type identifies a rule element provider. In this case, the data element provider-template 400 identifies ShoppingCartItemProvider 220. The identified rule element provider defines a set of choices for the editable rule element corresponding to the rule element holder. In addition, because provider-template 400 refers to ShoppingCartItemProvider 220, the type of editable rule element defined by ShoppingCartItemHolder 214 is string. In this way, a rule element holder defines the type of an editable rule element.

A rule element holder may also define an editable rule element as a collection of values. Number of items 402 specifies the number values in the collection. For example, suppose that number of items 402 is set to 5. In this case, ShoppingCartItemHolder 214 defines an editable rule element that may be a collection of up to five values. If number of items 402 were set to 1, then the editable rule element would not be a collection. In addition, number of items 402 may contain a flag to indicate whether or not the values in the collection should be unique.

For rule element holders of the template type, provider-template 400 refers to another template that defines a portion of a rule structure, which may include non-editable rule elements and editable rule elements. These other templates are useful for defining a partial rule structure frequently found in numerous rule structures.

6. Illustrative User Interface

As mentioned previously, rules generation system 100 generates user interfaces that accept choices for editable rule elements. The user interfaces are generated according to definitions specified by a particular template. FIG. 5 is a block diagram that depicts a screen for a user interface generated for rule template 200.

Referring to FIG. 5, screen 500 includes various graphical controls used to accept rule element choices from a user. Control 502 is a list box control. Label control 504 is displayed in association with control 502. Control 502 includes list 506. List 506 displays the rule element choices defined by ShoppingCartItemProvider 220 for ShoppingCartItemHolder 214. A user may only select a choice in list 506. The choices in the list are those belonging to the result set of query 312.

Control 508 is a text box control used for collecting integer rule elements representing an age. The user interface is configured to only accept the range specified by AgeProvider 222. i.e. 20 through xxx.

Control 510 is a list box control that includes list 514. List 514 displays the rule element choices defined by EmploymentStatusProvider 224 for EmploymentStatusHolder 218. The user may only select from one of the choices in the list, the choices being defined by EmploymentStatusProvide-r 224.

Submit button 516 is a command button manipulated by a user to store the rule element choices made through the interface. In response to manipulating the submit button 516, rules generation system 100 stores the choices as a template instance of rule template 200.

User interface definition 206 stores data that controls various characteristics of screen 500. For example, user interface definition 206 may include data specifying the background color of screen 500, as well as the font and font size of the labels.

7. Creating Rules from Templates

Figure 6:
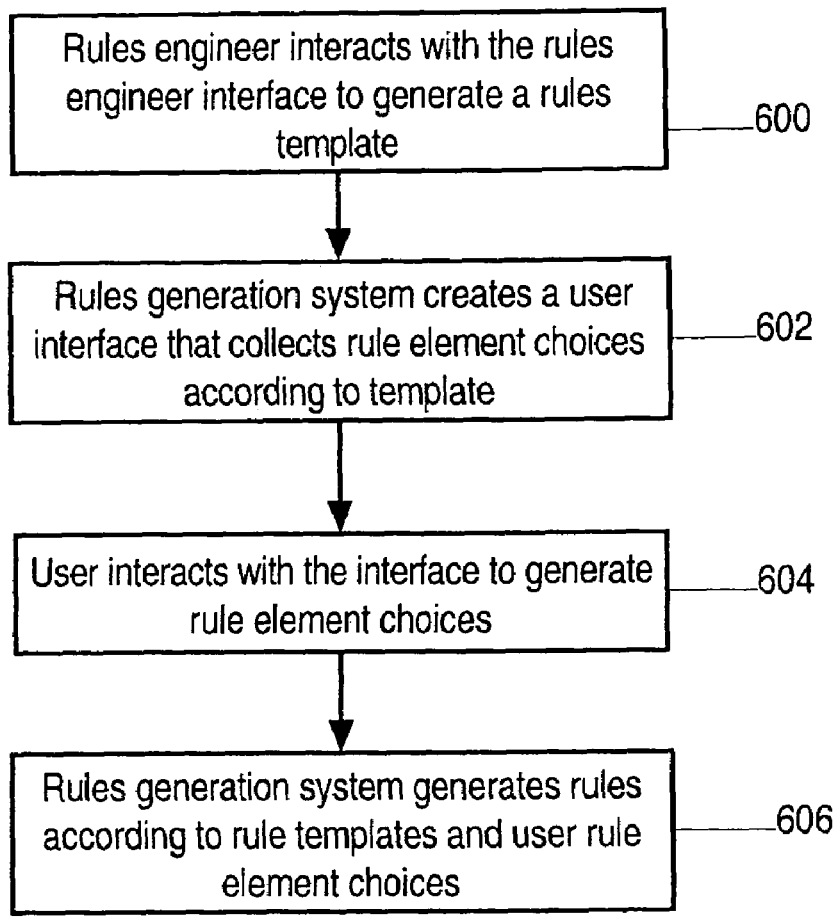
FIG. 6 is a block diagram depicting a process for generating rules according to an embodiment of the invention.

FIG. 6 is a flow diagram depicting a process for facilitating the generation and updating of rules using various components described previously, according to one embodiment of the invention.

Referring to FIG. 6, at step 600, rules engineer 110 interacts with the rules engineer interface 102 to generate rule template 200.

At step 602, rules generation system 100 creates a user interface that collects from user 122 rule element choices according to rule template 200.

At step 604, user 122 interacts with the user interface to generate rule element choices. Screen 500, as depicted in FIG. 5, shows the choices made by user 122. In response to manipulating submit button 505, the choices are stored as a rule template instance having the values shown in screen 500. Specifically, the editable rule elements that correspond to the following rule element holders have the following values: (1) for ShoppingCartItemHolder 214, 'Cognac' (2) for AgeHolder 216, '20' and (3) for EmploymentStatusHolder 218, "FullTime'.

At step 606, rules generation system 100 generates rules based upon rule template 200 and Template instances 126. Rule 150 (FIG. 1B) represents the rule generated for the current example.

8. Conditions as Editable Rule Elements

Figure 7:
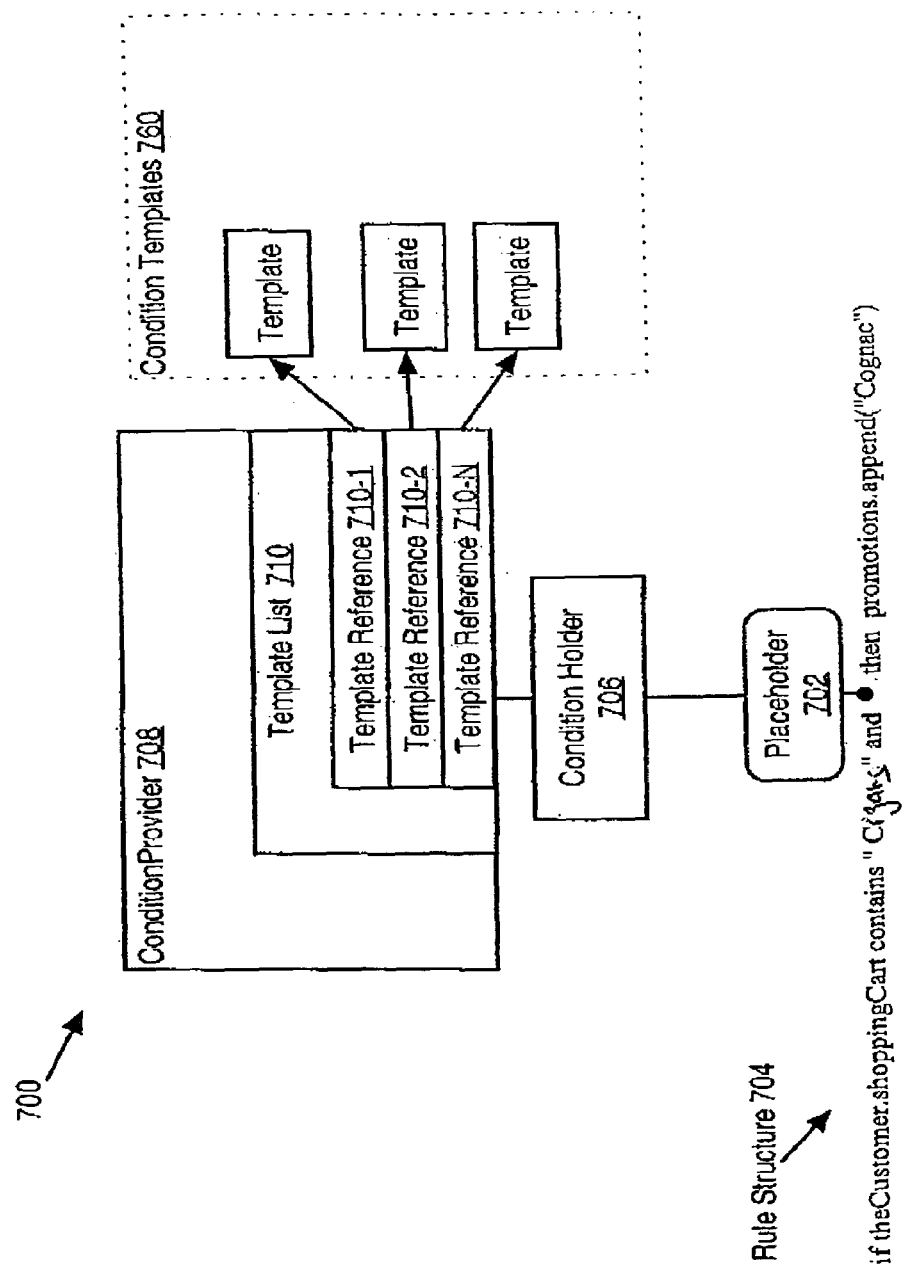
FIG. 7 is a block diagram depicting templates used to define selectable conditions for an editable rule element according to an embodiment of the invention.

Techniques for facilitating the generation and updating of rules have been illustrated using editable rule element types that are constant strings and integers. However, the techniques described herein may be used for other types of rule elements, such as operators and conditions. FIG. 7 illustrates a template that defines an editable rule element as a condition.

FIG. 7 shows some components of template 700, which define a rule structure having an editable rule element as a condition. Referring to FIG. 7, placeholder 702 is a placeholder within rule structure 704. Placeholder 702 refers to ConditionHolder 706, which refers to ConditionProvider 708.

ConditionProvider 708 defines a set of conditions which may be selected for an editable rule element. Specifically, ConditionProvider 708 includes template list 710, which contains template references 710-1 through 710-N. Each of template references 710-1 through 710-N refers to a condition template in condition templates 712. A condition template defines a rule structure for a condition, which may specify an expression or other partial rule structure. A condition template may also define editable rule elements.

A user interface for template 700 may include multiple screens, such as a screen for template 700 and a screen for each of the condition templates. When a user chooses a particular condition defined by condition template 700, a screen generated for that condition template is presented to the user. The screen may include graphic controls for editable rules elements defined by the condition template.

9. Reuse of Rule Templates by Ruleflow Templates

Software reuse is important to the development of applications. When developing an application, reuse of software, which may have already been developed and seasoned by time and use, allows applications to be developed more quickly and efficiently. According to an embodiment of the invention, rule templates may be re-used for multiple ruleflows.

Ruleflow templates define various entities that comprise a ruleflow. Ruleflow entities include tasks, entities that control the flow of execution between the tasks, and entities that are used by the tasks, such as objects, classes, variables, and rule templates.

Figure 8:
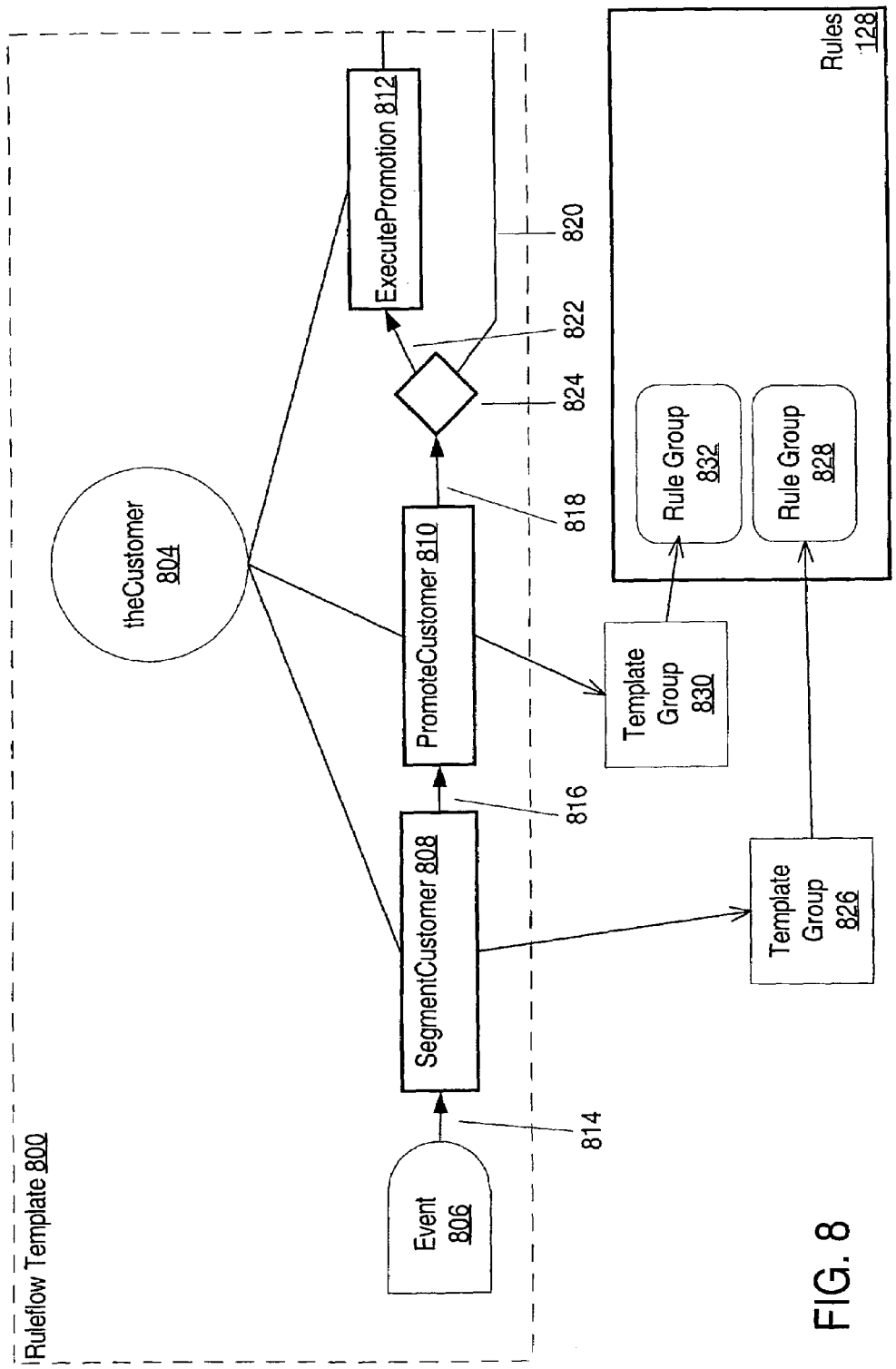
FIG. 8 is a block diagram depicting a ruleflow template according to an embodiment of the invention.

FIG. 8 is a block diagram that depicts ruleflow entities defined by ruleflow template 800, a ruleflow template from ruleflow templates 118. Ruleflow template 800 defines a ruleflow for advertising books using a banner displayed in the browser of a user. Referring to FIG. 8, ruleflow template 800 defines object theCustomer 804, event 806, rule tasks SegmentCustomer 808 and PromoteCustomer 810, function ExecutePromotion 812, and various other ruleflow entities not shown in FIG. 8. Event 806 defines an event that causes invocation of the ruleflow. For example, event 806 may be the receipt of form data by a web server.

Various components defined by ruleflow template 800 specify the flow of execution between tasks and other ruleflow entities. These include flow links 814, 816, 818, 820, and 822, and decision block 824. A flow link specifies that a particular task is performed after execution of another task, event, or decision. Flow link 816, for example, indicates that PromoteCustomer 810 is executed after SegmentCustomer 808 is executed.

Decision block 824 defines a branch in a ruleflow, and specifies logic that governs which branch is followed. Specifically, decision block 824 defines when a flow of execution follows link 822, and when the flow of execution follows flow link 820.

Rule task SegmentCustomer 808 defines a task that entails the execution of a set of rules to perform segmenting. Segmenting refers to a process of generating data that categorizes individuals into categories that are useful to advertising. Rules executed for SegmentCustomer 808 may include conditions based on attribute values in SegmentCustomer 808. Attributes of theCustomer 804 may be updated to reflect categories determined for the object theCustomer 804.

Data within ruleflow template 800 identifies template group 826 as a group of templates that define rule structures of rules executed as part of the task defined by SegmentCustomer 808. These rules are depicted in FIG. 8 as rule group 828. When the ruleflow is executed, rule group 828 is executed to perform the task of SegmentCustomer 808.

Likewise, for PromoteCustomer 810, data within ruleflow template 800 identifies template group 830 as a group of templates that defines rule structures of rules executed as part of the task defined by PromoteCustomer 810. These rules are depicted in FIG. 8 as rule group 832. The purpose of PromoteCustomer 810 is to determine what products to display in a banner.

ExecutePromotion 812 defines a function. Specifically, ExecutePromotion 812 defines operations that cause a banner to display information about a particular book.

10. Illustrative Re-Use of Rule Templates in a Ruleflow

Figure 9:
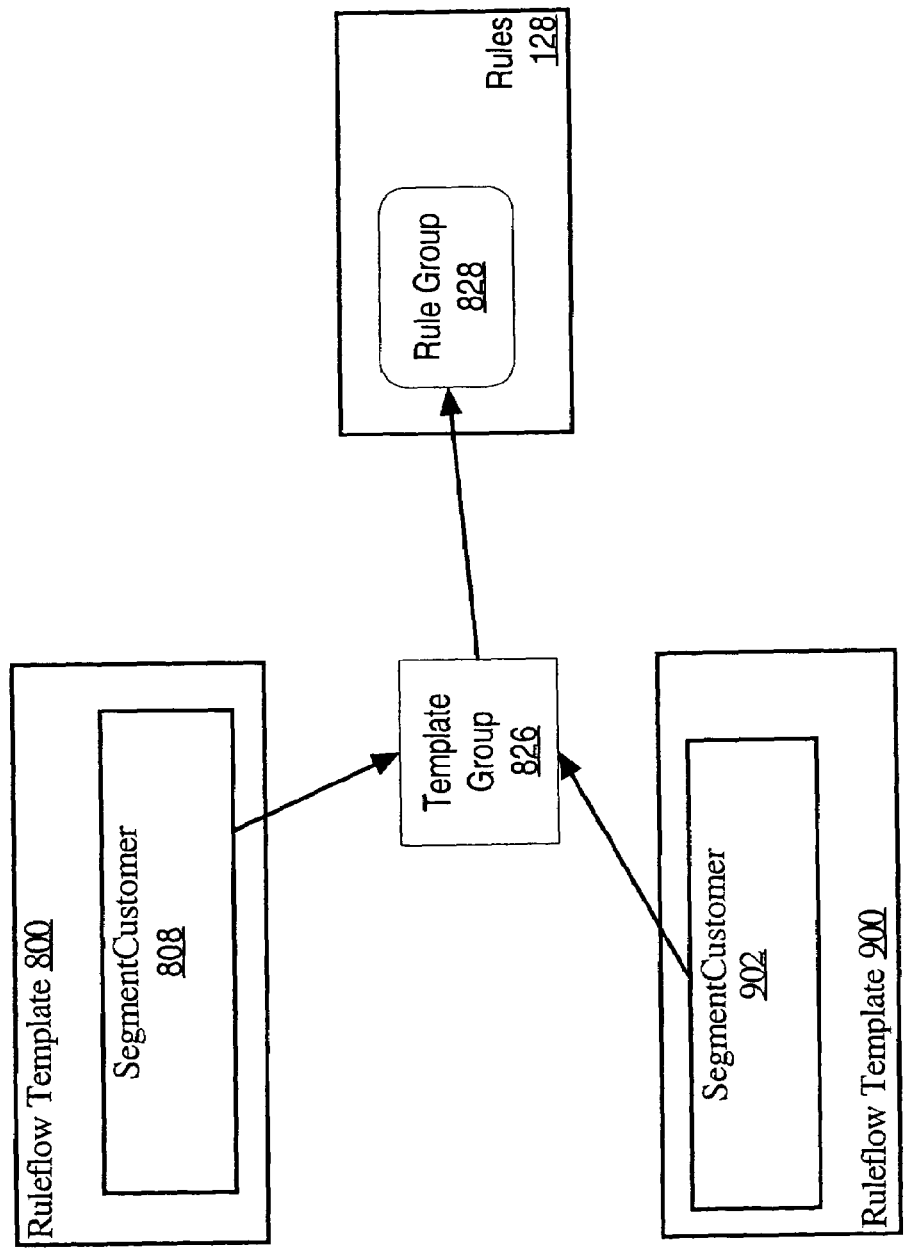
FIG. 9 is a block diagram depicting how multiple ruleflow templates may re-use rules associated with a template according to an embodiment of the invention.

FIG. 9 is a block diagram depicting how rule templates may be reused for different ruleflow templates. Referring to FIG. 9, it shows ruleflow template 800 and rule task SegmentCustomer 808, and ruleflow template 900. Ruleflow template 900 defines a ruleflow that segments customers in a manner similar to that of the ruleflow defined by ruleflow template 800. Ruleflow template 900 contains SegmentCustomer 902, which, like SegmentCustomer 808, identifies template group 826 as a group of templates that define rule structures of rules executed as part of SegmentCustomer 902. Similar to the application generated for ruleflow template 800, the application generated for row flow template 900 is configured to execute rule group 828 to perform the task defined by SegmentCustomer 902. In this way, rule templates, and rules generated for them, may be used to develop multiple applications more quickly and efficiently.

The benefits of rule template re-use extend beyond the initial development of applications. Once applications are developed, rules executed by multiple applications may need to be updated to reflect ever changing business conditions. The rules used by the applications defined by ruleflow templates 800 and 900 for segmenting may be modified by modifying one set of rules through user interfaces generated by user interface generator 104 based on template group 826. In this way, the rules tasks of multiple applications may be efficiently and quickly modified.

11. Implementation Mechanisms

The approach described herein for generating and editing rules is applicable to a wide variety of contexts and implementations depending upon the requirements of a particular application and the approach is not limited to any particular contexts and implementations. For example, the approach may be integrated into a rules architecture environment or a rules engine. As another example, the approach may be implemented as a stand-alone mechanism that is communicatively coupled to a rules architecture environment or rules engine. The approach may be implemented at a single location or may be implemented in a distributed computing environment. The approach may be implemented in computer hardware, software or firmware, or in any combination of computer hardware, software and firmware.

Figure 10:
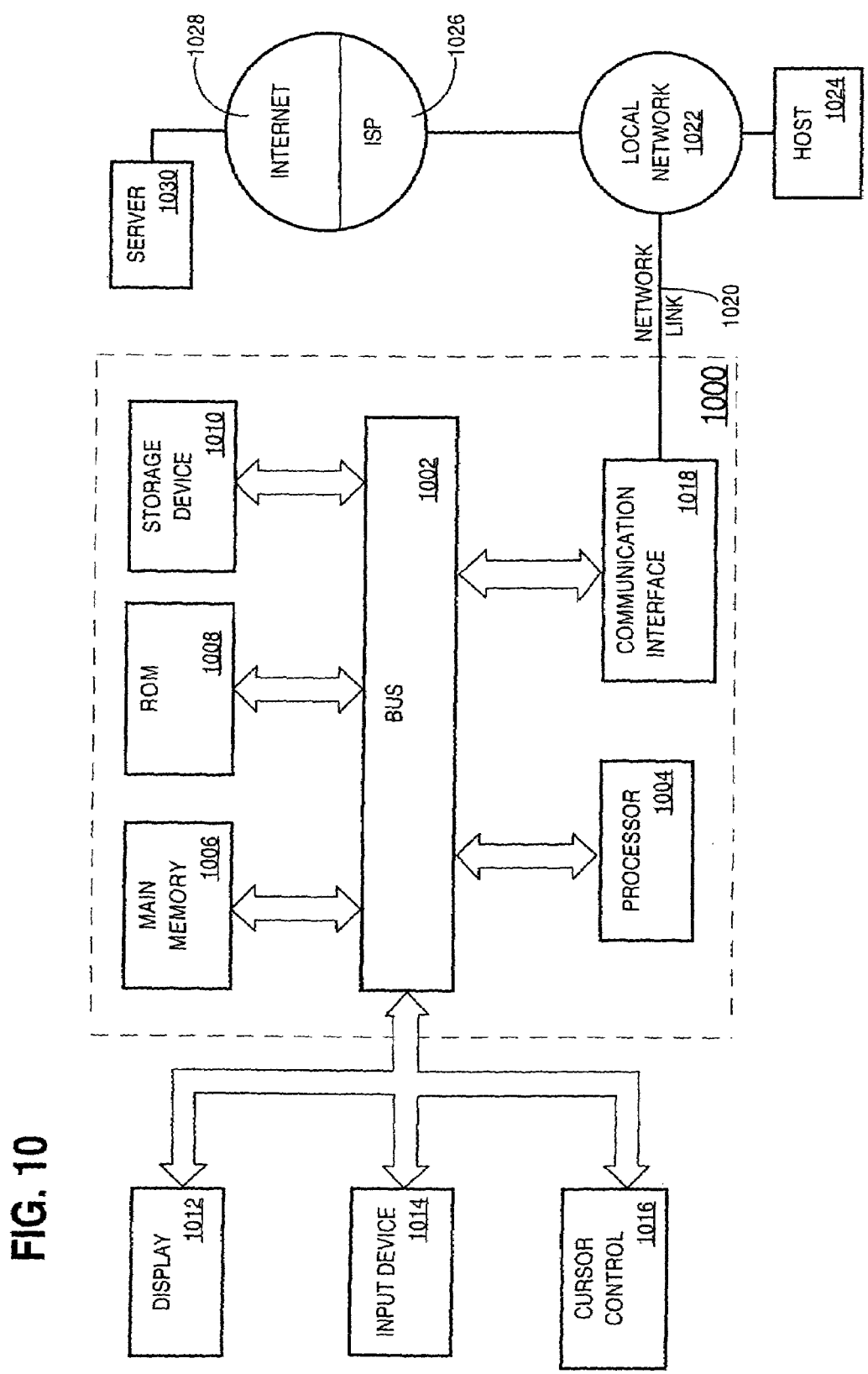
FIG. 10 is a block diagram depicting a computer system upon which embodiments of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for developing rules applications, wherein the method comprises the computer implemented steps of:
   generating a first template that defines a rules structure for rules that may be executed by a rules engine;
   generating a second template describing a first set of tasks that includes a first task and an association with said task and said first template;
   generating a set of rules based on said first template, wherein said association between said first task and said first template causes execution of said set of rules by said rules engine while executing said first task; and
   generating a third template describing a second set of tasks that includes a second task and association between said first template and said second task, wherein said association between said second task and said first template causes execution of said set of rules by said rules engine while executing said second task.

2. The method of claim 1 the method further including the steps:
   modifying said set of rules; and
   after modifying said set of rules, executing said first task or said second task,
   wherein executing said first task or said second task after modifying said set of rules causes execution of the modified set of rules.

3. The method of claim 1, wherein the step of generating said set of rules includes generating said set of rules based on said first template and instances of said first template.

4. The method of claim 3, further including the steps of:
   generating one or more user interfaces based on said first template; and
   generating said instances in response to said user interfaces receiving input from a user indicating values for said instances.

5. The method of claim 4, further including the steps of:
   generating a third template describing a second set of tasks that includes a second task and association between said first template and said second task, wherein said association between said second task and said first template causes execution of said set of rules by said rules engine while executing said second task;
   modifying said instances;
   modifying said set of rules based on said first template and the modifications to said instances; and
   after modifying said set of rules, executing said first task or said second task, wherein executing said first task or said second task after modifying said set of rules causes execution of the modified set of rules.

6. The method of claim 1, wherein said first template is a rule template.

7. The method of claim 1, wherein said second template is a ruleflow template describing tasks that entail execution of rules.

8. The method of claim 1, wherein said first template describes a structure of a business rule.

9. A method for developing software that involves the execution of rules by a rules engine, wherein the method comprises the computer implemented steps of:
   generating a group of rule templates that define rules structure for rules that may be executed by said rules engine;

generating a first ruleflow template that defines: a first set of tasks that includes a first task, and an association with said first task and said a group of rule templates;

generating a second ruleflow template that defines: a second set of tasks that includes a second task, and an association with said second task and said group of rule templates; and generating a set of rules based on said group of templates, wherein said association between said first task and said group of templates causes execution of said set of rules by said rules engine while executing said first task; and wherein said association between said second task and said group of templates causes execution of said set of rules by said rules engine while executing said second task.

10. A computer-readable medium carrying one or more sequences of instructions for developing rules applications, wherein execution of the one or more sequences of instructions by one or more processors causes the one or more processors to perform the steps of:

generating a first template that defines a rules structure for rules that may be executed by a rules engine;

generating a second template describing a first set of tasks that includes a first task and an association with said task and said first template;

generating a set of rules based on said first template;

wherein said association between said first task and said first template causes execution of said set of rules by said rules engine while executing said first task; and generating a third template describing a second set of tasks that includes a second task and association between said first template and said second task, wherein said association between said second task and said first template causes execution of said set of rules by said rules engine while executing said second task.

11. The computer-readable medium of claim 10, the computer-readable medium further including one or more instructions for performing the steps of:

modifying said set of rules; and after modifying said set of rules, executing said first task or said second task, wherein executing said first task or said second task after modifying said set of rules causes execution of the modified set of rules.

12. The computer-readable medium of claim 10, wherein the step of generating said set of rules includes generating said set of rules based on said first template and instances of said first template.

13. The computer-readable medium of claim 12, further including one or more instructions for performing the steps of:

generating one or more user interfaces based on said first template; and generating said instances in response to said user interfaces receiving input from a user indicating values for said instances.

14. The computer-readable medium of claim 13, further including one or more instructions for performing the steps of:

generating a third template describing a second set of tasks that includes a second task and association between said first template and said second task, wherein said association between said second task and said first template causes execution of said set of rules by said rules engine while executing said second task;

modifying said instances;

modifying said set of rules based on said first template and the modifications to said instances; and after modifying said set of rules; executing said first task or said second task, wherein executing said first task or said second task after modifying said set of rules causes execution of the modified set of rules.

15. The computer-readable medium of claim 10, wherein said first template is a rule template.

16. The computer-readable medium of claim 10, wherein said second template is a ruleflow template describing tasks that entail execution of rules.

17. The computer-readable medium of claim 10, wherein said first template describes a structure of a business rule.

18. A computer-readable medium carrying one or more sequences of instructions for developing software that involves the execution of rules by a rules engine, wherein execution of the one or more sequences of instructions by one or more processors causes the one or more processors to perform the steps of;

generating a group of rule templates that define rules structure for rules that may be executed by said rules engine;

generating a first ruleflow template that defines: a first set of tasks that includes a first task, and an association with said first task and said group of rule templates;

generating a second ruleflow template that defines: a second set of tasks that includes a second task, and an association with said second task and said group of rule templates; and generating a set of rules based on said group of templates, wherein said association between said first task and said group of templates causes execution of said set of rules by said rules engine while executing said first task, and wherein said association between said second task and said group of templates causes execution of said set of rules by said rules engine while executing said second task.

19. A method for developing rules applications, wherein the method comprises the computer implemented steps of:

generating a first template that defines a rules structure for rules that may be executed by a rules engine;

generating a second template describing a first set of tasks that includes a first task and an association with said task and said first template;

generating a set of rules based on said first tern plate, wherein said association between said first task and said first template causes execution of said set of rules by said rules engine while executing said first task; and wherein the step of generating said set of rules includes generating said first set of rules based on said first template and instances of said first template.

20. The method of claim 19, the method further including the steps:

modifying said set of rules; and after modifying said set of rules, executing said first task and said second task, wherein executing said first task and said second task after modifying said set of rules causes execution of the modified set of rules.

21. The method of claim 19, further including the steps of:

generating one or more user interfaces based on said first template; and generating said instances in response to said user interfaces receiving input from a user indicating values for said instances.

22. The method of claim 21, further including the steps of:

generating a third template describing a second set of tasks that includes a second task and association between said first template and said second task, wherein said association between said second task and said first template causes execution of said set of rules by said rules engine while executing said first task; modifying said instances;

modifying said set of rules based on said first template and the modifications to said instances; and after modifying said set of rules, executing said first task and said second task, wherein executing said first task and said second task after modifying said set of rules causes execution of the modified set of rules.

23. The method of claim 19, wherein said first template is a rule template.

24. The method of claim 19, wherein said second template is a ruleflow template describing tasks that entail execution of rules.

25. The method of claim 19, wherein said first template describes a structure of a business rule.

26. A computer-readable medium carrying one or more sequences of instructions for developing rules applications, wherein execution of the one or more sequences of instructions by one or more processors causes the one or more processors to perform the steps of:

generating a first template that defines a rules structure for rules that may be executed by a rules engine;

generating a second template describing a first set of tasks that includes a first task and an association with said task and said first template;

generating a set of rules based on said first template;

wherein said association between said first task and said first template causes execution of said set of rules by said rules engine while executing said first task; and wherein the step of generating said set of rules includes generating said first set of rules based on said first template and instances of said first template.

27. The computer-readable medium of claim 26, the computer-readable medium further including one or more instructions for performing the steps of:

modifying said set of rules; and after modifying said set of rules, executing said first task and said second task, wherein executing said first task and said second task after modifying said set of rules causes execution of the modified set of rules.

28. The computer-readable medium of claim 26, further including one or more instructions for performing the steps of:

generating one or more user interfaces based on said first template; and generating said instances in response to said user interfaces receiving input from a user indicating values for said instances.

29. The computer-readable medium of claim 26, further including one or more instructions for performing the steps of:

generating a third template describing a second set of tasks that includes a second task and association between said first template and said second task, wherein said association between said second task and said first template causes execution of said set of rules by said rules engine while executing said first task; modifying said instances;

modifying said set of rules based on said first template and the modifications to said instances; and after modifying said set of rules, executing said first task and said second task, wherein executing said first task and said second task after modifying said set of rules causes execution of the modified set of rules.

30. The computer-readable medium of claim 26, wherein said first template is a rule template.

31. The computer-readable medium of claim 26, wherein said second template is a ruleflow template describing tasks that entail execution of rules.

32. The computer-readable medium of claim 26, wherein said first template describes a structure of a business rule.

33. A method for developing rules applications, wherein the method comprises the computer implemented steps of:

generating rule element data that defines a set of choices that a user may choose for a rule element;

receiving user choice data that specify one or more choices made by the user for the rule element; and generating the rule based upon the user choice data; and generating a first template that defines a rules structure for rules that may be executed by a rules engine.

34. The method of claim 33, further comprising the step of:

generating a second template describing a first set of tasks that includes a first task and an association with said task and said first template.

35. The method of claim 34, further comprising the step of:

generating a set of rules based on said first template, wherein said association between said first task and said first template causes execution of said set of rules by said rules engine while executing said first task.

36. A method for developing rules applications, wherein the method comprises the computer implemented steps of:

providing a rule structure with one or more rule elements and an editable rule element;

providing an editable rule element type, and a set of choices that a user may choose for the editable rule element;

receiving user choice data that specify one or more choices chosen by the user for the rule element;

generating the rule based upon the user choice data;

generating a first template that defines a rules structure for rules that may be executed by a rules engine;

generating a second template describing a first set of tasks that includes a first task and an association with said task and said first template;

wherein said association between said first task and said first template causes execution of said set of rules by said rules engine while executing said first task.

37. A method for developing rules applications, wherein the method comprises the computer implemented steps of:

generating a first template that defines a rules structure for rules that may be executed by a rules engine;

generating a second template describing a first set of tasks that includes a first task and an association with said task and said first template;

generating a set of rules based on said first template, wherein said association between said first task and said first template causes execution of said set of rules by said rules engine while executing said first task;

wherein the step of generating a second template describing an association with said first task and said first template includes the step of generating a second template that describes an association between said first task and a template group that includes said first template; and generating a third template describing a second set of tasks that includes a second task and association between said first template and said second task, wherein said association between said second task and said first template causes execution of said set of rules by said rules engine while executing said second task.

38. The method of claim 37, the method further including the steps:

modifying said set of rules; and after modifying said set of rules, executing said first task or said second task, wherein executing said first task or said second task after modifying said set of rules causes execution of the modified set of rules.

39. A method for developing rules applications, wherein the method comprises the computer implemented steps of:

generating a first template that defines a rules structure for rules that may be executed by a rules engine;

generating a second template describing a first set of tasks that includes a first task and an association with said task and said first template;

generating a set of rules based on said first template, wherein said association between said first task and said first template causes execution of said set of rules by said rules engine while executing said first task;

wherein the step of generating a second template describing an association with said first task and said first template includes the step of generating a second template that describes an association between said first task and a template group that includes said first template;

wherein, the step of generating said set of rules includes generating said first set of rules based on said first template and instances of said first template;

generating one or more user interfaces based on said first template;

generating said instances in response to said user interfaces receiving input from a user indicating values for said instances;

generating a third template describing a second set of tasks that includes a second task and association between said first template and said second task, wherein said association between said second task and said first template causes execution of said set of rules by said rules engine while executing said second task;

modifying said instances;

modifying said set of rules based on said first template and the modifications to said instances; and after modifying said set of rules, executing said first task or said second task, wherein executing said first task or said second task after modifying said set of rules causes execution of the modified set of rules.

40. A method for developing software that includes the execution of rules by a rules engine, wherein the method comprises the computer implements steps of:

generating a group of rule templates that define rules structure for rules that may be executed by said rules engine;

generating a first ruleflow template that defines a first set of tasks that includes a first task, and an association with said first task and a group of rule templates;

generating a second ruleflow template that defines a second set of tasks that includes a second task, an association with said second task and said group of rule templates;

generating a set of rules based on said group of templates;

wherein said association between said first task and said group of templates causes execution of said set of rules by said rules engine while executing said first task;

wherein said association between said second task and said group of templates causes execution of said set of rules by said rules engine while executing said first task;

wherein said association between said second task and said group of templates causes execution of said set of rules by said rules engine while executing said second task;

generating one or more user interfaces based on said group of rule templates;

generating instances of said group of rule templates in response to said user interfaces receiving input from a user indicating values for said instances;

generating changes to said instances in response to said user interface receiving further input from said user indicating new values for said instances;

modifying said set of rules based on said group of rule templates and said changes to said instances; and after modifying said set of rules, executing said first task or said second task, wherein executing said first task or said second task after modifying said set of rules causes execution of the modified set of rules.

41. A computer-readable medium carrying one or more sequences of instructions for developing rule applications, wherein execution of the one or more sequences of instructions by one or more processors causes the one or more processors to perform the steps of:

generating a first template that defines a rules structure for rules that may be executed by a rules engine;

generating a second template describing a first set of tasks that includes a first task and an association with said task and said first template;

generating a set of rules based on said first template;

wherein said association between said first task and said first template causes execution said set of rules by said rules engine while executing said first task;

wherein the step of generating a second template describing an association with said first task and said first template includes the step of generating a second template that describes an association between said first task and a template group that includes said first template; and generating a third template describing a second set of tasks that includes a second task and association between said first templates and said second task, wherein said association between said second task and said first template second task.

42. The computer-readable medium of claim 41, the computer-readable medium further including one or more instructions for performing the steps of:

modifying said set of rules; and after modifying said set of rules, executing said first task or said second task, wherein executing said first task or said second task after modifying said set of rules causes execution of the modified set of rules.

43. A computer-readable medium carrying one or more sequences of instructions for developing rule applications, wherein execution of the one or more sequences of instructions by one or more processors causes the one or more processors to perform the steps of:

generating a first template that defines a rules structure for rules that may be executed by a rules engine;

generating a second template describing a first set of tasks that includes a first task and an association with said task and said first template;

generating a set of rules based on said first template;
wherein said association between said first task and said first template causes execution said set of rules by said rules engine while executing said first task;
wherein the step of generating a second template describing an association with said first task and said first template includes the step of generating a second template that describes an association between said first task and a template group that includes said first template;
wherein the step of generating said set of rules includes generating said first set of rules based on said first template and instances of said first template;
generating one or mare user interfaces based on said first template;
generating said instances in response to said user interfaces receiving input from a user indicating values for said instances;
generating a third template describing a second set of tasks that includes a second task and association between said first template and said second task, wherein said association between said second task and said first template causes execution of said set of rules by said rules engine while executing said second task;
modifying said instances;
modifying said set of rules based on said first template and the modifications to said instances; and
after modifying said set of rules, executing said first task or said second task, wherein executing said first task or said second task after modifying said set of rules causes execution of the modified set of rules.

44. A computer-readable medium carrying one more sequences of instructions for developing software that involves the execution of rules by a rules engine, wherein execution of the one or more sequences of instructions by one or more processors causes the one or more processors to perform the steps of:

generating a group of rule templates that define rules structure for rules that may be executed by said rule engine;
generating a first ruleflow template that defines a first set of tasks that includes a first task, and an association with said first task and a group of rule templates;
generating a second ruleflow template that defines a second set of tasks that includes a second task, an association with said second task and said group of rule templates;
generating a set of rules based on said group of templates, wherein said association between said first task and said group of templates causes execution of said set of rules by said rules engine while executing said first task, and wherein said association between said second task and said group of templates causes execution of said set of rules by said rules enginewhile executing said second task;
generating one or more user interfaces based on said group of rule templates; generating instances of said group of rule templates in response to said user interfaces receiving input from a user indicating values for said instances;
generating changes to said instances in response to said user interface receiving further input from said user indicating new values for said instances;
modifying said set of rules based on said group of rule templates and said changes to said instances; and
after modifying said set of rules, executing said first task or said second task, wherein executing said first task or said second task after modifying said set of rules causes execution of the modified set of rules.

* * * * *

UNITED STATES PATENT AND TRADEMARK OFFICE
CERTIFICATE OF CORRECTION

| | | |
|---|---|---|
| PATENT NO. | : 7,152,053 B2 | Page 1 of 1 |
| APPLICATION NO. | : 11/059172 | |
| DATED | : December 19, 2006 | |
| INVENTOR(S) | : Carlos A. Serrano-Morales et al. | |

It is certified that error appears in the above-identified patent and that said Letters Patent is hereby corrected as shown below:

Title Page should read

[75] Inventors: Carlos A. Serrano-Morales, Sunnyvale, CA (US); David J. Mellor, Burlingame, CA (US); Chris G.C. Werner, Tabuadelo (PT); Jean-Luc Marce, Sunnyvale, CA (US); Marc Lerman, Fontenay sous Bois (FR).

Signed and Sealed this

Eighteenth Day of December, 2007

JON W. DUDAS
*Director of the United States Patent and Trademark Office*